United States Patent Office 3,471,998
Patented Oct. 14, 1969

3,471,998
PROCESS FOR PURIFYING FORMALDEHYDE
Shin'ichi Ishida, Akira Kajihara, Akira Tokushige, Hayashi Ohki, and Kunio Sato, Tokyo, Japan, assignors to Asahi Kasei Kogyo Kabushiki Kaisha, Osaka, Japan
No Drawing. Filed Aug. 8, 1967, Ser. No. 659,008
Claims priority, application Japan, Aug. 17, 1966, 41/53,726
Int. Cl. B01d 47/02
U.S. Cl. 55—48        8 Claims

ABSTRACT OF THE DISCLOSURE

Process for purifying crude fromaldehyde containing impurities which comprises bringing the formaldehyde into contact with at least a member selected from sulfolane, a mixture of sulfolane with a solvent, methylsulfolane and a mixture of methylsulfolane with a solvent.

BACKGROUND OF THE INVENTION

Field of the invention

This invention relates to a novel process for purifying formaldehyde, and more particularly, it relates to a process for the continuous purification of formaldehyde by bringing gaseous crude formaldehyde continuously into contact with sulfolanes.

Description of the prior art

Heretofore, pure and anhydrous formaldehyde has been obtained either by passing gaseous crude formaldehyde containing impurities through a number of cooling traps, or, by subjecting the same to a partial polymerization, as described in "Formaldehyde," J. F. Walker, p. 44 (third edition), Reinhold Publishing Corp. However, these prior art processes not only involve complications in the operation but also are disadvantageous from an economical standpoint, thus, they may not be successfully worked on a commercial scale.

For this reason, there have been proposed processes for the purification of formaldehyde by the washing of gaseous crude formaldehyde with various liquids. For example, U.S. Patent No. 2,780,652 discloses the process for washing gaseous formaldehyde with polyethylene glycol dialkylether. German Patent No. 1,137,425 describes the washing of gaseous formaldehyde with cyclic carbonate at a temperature of from −10° C. to 40° C., and furthermore, U.S. Patent No. 2,943,701 proposes the washing of gaseous formaldehyde with hemiformal at a low temperature.

SUMMARY OF THE INVENTION

It is an object of this invention to provide a novel process for producing pure and substantially anhydrous formaldehyde from crude formaldehyde containing impurities such as water, methanol, formic acid, methyl formate, etc., which may be obtained in any conventional processes.

Another object of this invention is to provide a process for producing formaldehyde of a high purity useful in the production of a high molecular weight polyoxymethylene.

These objects of this invention mentioned above can now be accomplished by the process of this invention which comprises bringing a stream of gaseous formaldehyde containing impurities continuously into contact with sulfolane, methylsulfolane or mixtures thereof to remove such impurities as mentioned above therefrom thereby obtaining formaldehyde having a high purity.

The processes for the purification of formaldethyde comprising bringing crude formaldehyde into contact with a certain kind of liquid have been known well heretofore as noted from the references given hereinbefore. However, in the processes for washing formaldehyde as proposed heretofore, there are several serious problems. Foremost of these is the polymerization of formaldehyde and the resulting polymerization products. In general, the solubilities of impurities to be removed in the washing liquid are increased as the temperature of the liquid is decreased, while the undesirable polymerization of formaldehyde inevitably occurs at a low temperature. In fact, most of the prior art processes proposed heretofore has been impossible or very difficult to carry out on a practical scale for this particular reason. Thus, in order to avoid the inconvenience of polymerization of formaldehyde, the washing had to be conducted at a higher temperature. However, in general, the solubilities of impurities in the washing liquid significantly decrease as the temperature of the liquid is increased and the washing efficiency is consequently greatly degraded. The washing at a high temperature also inevitably leads to a considerable loss of the washing liquid due to the evaporation thereof or to an entrainment of the washing liquid in the formaldehyde stream.

Moreover, washing of gaseous crude formaldehyde with liquids presents other problems. For example, special precautions must be taken with respect to the corrosion of the equipment used, and the contamination, chemical deterioration, regeneration and recovery of the washing liquid. Particularly, the regeneration of washing liquid is an important factor in the continuous process and it is highly desirable that the regeneration process may be caried out just as readily as the washing process. In this respect, the conventional washing liquids known heretofore such as cyclic carbonate, diethylene glycol dimethylether present some difficulty.

Sulfolane and methylsulfolane which may be used in the process of this invention have unexpectedly desirable properties in contrast with the conventional washing liquids known heretofore, specifically in the following points:

(1) lower vapor pressures,
(2) high ability of dissolving impurities such as water, methanol, formic acid, etc. even at a high temperature,
(3) non-reactivity with formaldehyde,
(4) non-reactivity with impurities mentioned above,
(5) stability against acidic substances, air and oxidizing substances,
(6) stability at a high temperature,
(7) easiness of regeneration due to their vapor pressure characteristics,
(8) non-corrosiveness, and
(9) small specific heat.

Thus, in accordance with the process of this invention which makes use of sulfolanes, gaseous crude formaldehyde is passed through sulfolanes at a high temperature, at which no polymerization of formaldehyde possibly occurs, to dissolve completely the impurities therein thereby affording a highly purified formaldehyde. Then, the resulting sulfolane containing the impurities is recycled to the washing stage after eliminating the impurities therefrom, for example, by heating at higher temperature, exposing to a reduced pressure, treating with solid absorbing agent or drying agent, or stripping with gases. Thus, according to the process of this invention, the washing of crude formaldehyde and the regeneration of the washing liquid used can be easily carried out continuously and economically.

The washing according to the process of this invention is carried out at a temperature of from 90 to 150° C., and preferably from 100 to 130° C.

When conventional washing agents such as ethylene carbonate, methyl carbitol, carbitol acetate, etc., are used under the conditions of the process of this invention, the undesirable reaction of formaldehyde therewith and the accumulation of formaldehyde oligomer takes place and the regeneration of these washing agents becomes very troublesome. Even polyethylene glycol alkylether, which is believed as the most preferable washing agent of all, dissolves formaldehyde oligomer therein and gives rise to such problems as deposition and clogging in the equipment during the course of regeneration stage. The process of this invention is generally free from such inconveniences, though such inconveniences may occur depending upon the operation conditions. However, it may be cured by a simple remedy, i.e. by the presence of a non-volatile strongly acidic substance which is capable of decomposing formaldehyde oligomer in sulfolane or methylsulfolane washing liquid.

At a high temperature in the vicinity of 100° C. which is used in the present washing, ethylene carbonate, polyethylene glycol ether would be decomposed by such strongly acidic substances, while sulfolane and methylsulfolane used in this invention is not. Thus, since the washing liquid used in the process of this invention does not contain formaldehyde nor oligomer thereof, only water and other impurities absorbed therein are required to be removed therefrom upon the regneration of the washing liquid.

In practising the process of this invention, although a satisfactory result may be obtained by passing gaseous crude formaldehyde once through sulfolane, or methylsulfolane or a mixture thereof, a purified formaldehyde having still higher purity may be obtained by conducting the washing in two stages.

More practically, the first washing is carried out at a temperature of from 90 to 150° C. as described above, and the second washing is conducted at a temperature of from —20° C. to 90° C. By the first washing mentioned above, the impurities contained in crude formaldehyde are removed therefrom, and by the subsequent second washing, there is recovered a vaporized sulfolane entrained with the purified formaldehyde obtained by the first washing.

In the second washing process mentioned above, it is desirable to pass formaldehyde obtained in the first purifying stage through sulfolane as a washing liquid at a temperature of —20° to 90° C. The reason is that since the purity of formaldehyde entering the second stage is higher than 99% already, scarcely any polymerization occurs even at such low temperature, i.e. —20°–90° C. In addition, at such low temperature, the content of vaporized sulfolane entrained with the purified formaldehyde is decreased due to the lowering of vapor pressure of sulfolane, and further, the escape of sulfolane due to its evaporation can be remarkably reduced.

In the second washing stage of the process of this invention, washing liquids which are good solvents for sulfolanes but non-solvents for formaldehyde, or which are non-solvents to both sulfolanes and formaldehyde may also be used. For example, aliphatic or aromatic hydrocarbons, and particularly liquid paraffin are preferably used. The use of these liquids facilitate the recovery of sulfolanes.

Alternatively, these solvents exemplified above may be used in admixture with sulfolanes. When these solvents or mixtures of these solvents with sulfolanes are used as washing liquids, the washing is carried out at a temperature of from —20° to 90° C. as described above.

Although liquid paraffin is a non-solvent for sulfolanes and practically to formaldehyde, it serves as a trap to sulfolanes at a low temperature. Since paraffin is incompatible with sulfolanes, they are separated into two layers, thus, sulfolanes can be recovered quite conveniently. Also, the polymerization solvents for formaldehyde such as n-hexane, cyclohexane and the like may be conveniently used in the second washing stage.

In practising the second washing process of this invention, an empty trap may be used in place of the second washing column or separation column under the same conditions.

Sulfolanes containing thus absorbed impurities may be regenerated by subjecting the same to a treatment at a temperature of above 100° C. but below the boiling point thereof under normal or a reduced pressure to release the impurities absorbed therefrom.

The amount of sulfolane or methylsulfolane used in the process of this invention is dependent upon the purity of the starting gas and the purity of the product formaldehyde contemplated.

In accordance with the process of this invention, formaldehyde oligomer produced in the course of the purification process is reverted to gaseous state by the presence of a small amount of phosphoric acid, phosphorus pentoxide, aromatic sulfonates, or strongly acidic ion exchange resin in either the washing column or the regeneration column. Thus, the oligomer does not accumulate in the washing column, and the deposition and clogging in the regeneration column can be successfully prevented.

The purification of formaldehyde containing larger amounts of impurities may be carried out at a relatively high temperature as described above, and, on the other hand, the purification of formaldehyde which has been purified up to such an extent that the polymerization hardly occurs at a low temperature may be carried out at even lower temperature, e.g. —20° C. to 90° C., and, if required, under a reduced pressure. In this instance, it has been confirmed that the high purity formaldehyde containing less than 100 p.p.m. of water can be obtained.

When the purification is conducted at such a low temperature, sulfolane may be used as a washing liquid in admixture with other sulfolanes such as methylsulfolane, or a suitable solvent.

The process of this invention may be practised under normal pressure. However, an elevated pressure is desirable since the rate of absorption of water in the washing liquid is increased due to the increase in the partial pressure of water.

Sulfolane dissolves 10% by weight of water therein even at a temperature as high as 114° C., i.e. the absorption of water from hydrous formaldehyde is extraordinarily high even at a high temperature. Therefore, the ratio of the starting gas to the washing liquid can be made larger as compared with the other absorbing agents known heretofore, and the ratio may be optionally decided in accordance with the design of the equipment and the operating conditions.

In the process of this invention, if required, sulfolanes may be used in admixture with other solvents such as aromatic or paraffinic hydrocarbons, or other polar solvents without giving any adverse effect.

DESCRIPTION OF THE PREFERRED EMBODIMENTS

This invention may be explained more fully and practically in the following examples.

It should not be construed, however, that these Examples restrict this invention as they are given merely by way of illustration.

Example 1

From the top of a column of 25 mm. diameter and 15 cm. height filled with small glass balls of 3 mm. diameter dried sulfolane containing 70 p.p.m. of water was flowed downwardly continuously at a rate of 20 ml./min. The column was heated at 110° C. by a heating jacket.

Formaldehyde obtained by the pyrolysis of paraformaldehyde of various purities were fed from the bottom of the column and discharged from the top.

The results are shown in the following table.

| Experiment No. | Impurities in formaldehyde introduced | | | Impurities in formaldehyde discharged | | |
|---|---|---|---|---|---|---|
| | Water Percent | Methanol Percent | Formic acid Percent | Water Percent | Methanol Percent | Formic acid Percent |
| 1 | 4.0 | 0.6 | 0.05 | 0.10 | 0.05 | 0.00 |
| 2 | 2.0 | 0.4 | 0.12 | 0.06 | 0.02 | 0.00 |
| 3 | 1.1 | 0.5 | 0.14 | 0.02 | 0.01 | 0.00 |
| 4 | 14.0 | 0.7 | 0.03 | 0.17 | 0.05 | 0.00 |

Example 2

In liquid paraffin was suspended 100 parts of paraformaldehyde of 99.1% purity and thermally decomposed at a temperature of 140–160° C.

From the top of a glass column of 30 mm. diameter and 50 cm. height, packed with glass Raschig rings 600 parts of sulfolane preheated at 105° C. was flowed downwardly. The column was heated at 105° C. by a jacket. The formaldehyde obtained by the pyrolysis of paraformaldehyde was fed to the bottom of the column via a heating tube, then, discharged from the top of the column and fed to a trap filled with 100 parts of sulfolane where the gas was further washed. The trap was maintained at a temperature of 40° C.

The water content in the discharged formaldehyde gas at the outlet of the washing column was 0.03% and that at the outlet of the trap was less than 0.01%. The entrainment of sulfolane was not detectable by gas chromatography and only 1.6% by weight of formaldehyde was detected in the trap.

Example 3

Formaldehyde purified by using the same equipment as in Example 2, containing 2000 p.p.m. of water, about 300 p.p.m. of methanol and 20 p.p.m. of formic acid was washed by using the same washing column as in Example 2 at a column temperature of 40° C. under a pressure of 400 mm./Hg. The resulting formaldehyde was found to contain 300 p.p.m. of water, 60 p.p.m. of methanol and 10 p.p.m. of formic acid.

Example 4

Example 3 was repeated according to the same procedures as described therein except that a mixed washing liquid consisting of the equal amounts of sulfolane and methylsulfolane was used and scrubbing was carried out at a temperature of from −16° C. to 10° C.

As a result, there was obtained purified gaseous formaldehyde containing 70 p.p.m. of water, 40 p.p.m. of methanol and undetectable formic acid.

We claim:

1. A process for purifying gaseous formaldehyde containing at least one impurity from the group consisting of water, methanol, formic acid, and methyl formate, which comprises contacting the formaldehyde with at least one washing agent selected from the group consisting of sulfolane, methylsulfolane and mixtures thereof, whereby said impurity is dissolved in said washing agent, and recovering the thus-purified formaldehyde from the said washing agent.

2. A process according to claim 1 wherein the washing agent is admixed with a liquid aromatic hydrocarbon or a liquid aliphatic hydrocarbon at a temperature of −20° to 90° C.

3. A process for purifying gaseous formaldehyde containing at least one impurity from the group consisting of water, methanol, formic acid and methyl formate which comprises contacting the formaldehyde with at least one washing agent from the group consisting of sulfolane, methylsulfolane and mixtures thereof, and in the presence of a non-volatile strongly acidic substance from the group consisting of phosphoric acid and phosphorous pentoxide, separating the formaldehyde from the washing agent and the acidic substance and recovering the thus-treated formaldehyde.

4. A process according to claim 1 in which the formaldehyde is contacted with the washing agent under an elevated pressure.

5. A process according to claim 2 in which the formaldehyde is contacted with the washing agent and the hydrocarbon under elevated pressure.

6. A process for purifying gaseous formaldehyde containing at least one impurity from the group consisting of water, methanol, formic acid and methyl formate which comprises contacting the formaldehyde in a first stage with at least one washing agent from the group consisting of sulfolane, methylsulfolane and mixtures thereof, at a temperature of 90° to 150° C. and then contacting the thus-treated formaldehyde in a second stage with a washing agent from the group consisting of liquid aliphatic hydrocarbons and liquid aromatic hydrocarbons at a temperature of −20° to 90° C., and recovering the thus-treated formaldehyde.

7. A process according to claim 1 in which the formaldehyde is contacted with the washing agent at a temperature of 90° to 150° C.

8. A process for purifying gaseous formaldehyde containing at least one impurity from the group consisting of water, methanol, formic acid and methyl formate which comprises contacting the formaldehyde in a first stage with a least one washing agent from the group consisting of sulfolane, methylsulfolane and mixtures thereof at a temperature of 90° to 150° C., contacting the formaldehyde from said first stage in a second stage with a washing agent from the group consisting of sulfolane, methylsulfolane, liquid aliphatic hydrocarbons, liquid aromatic hydrocarbons, and mixtures thereof at a temperature of −20° to 90° C. and recovering the thus-treated formaldehyde.

References Cited

Deal et al., "Chemical Abstracts," vol. 60, col. 12920, 1964.

LEON ZITVER, Primary Examiner

R. A. LILES, Assistant Examiner

U.S. Cl. X.R.

55—93; 260—606